United States Patent
Kociubes et al.

(10) Patent No.: US 10,067,954 B2
(45) Date of Patent: Sep. 4, 2018

(54) USE OF DYNAMIC DICTIONARY ENCODING WITH AN ASSOCIATED HASH TABLE TO SUPPORT MANY-TO-MANY JOINS AND AGGREGATIONS

(71) Applicant: Oracle International Corporation, Redwood Shores, CA (US)

(72) Inventors: Adam Kociubes, Bedford, MA (US); Ekrem Soylemez, Lexington, MA (US); Hyemin Chung, Arlington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 372 days.

(21) Appl. No.: 14/806,576

(22) Filed: Jul. 22, 2015

(65) Prior Publication Data

US 2017/0024435 A1 Jan. 26, 2017

(51) Int. Cl.
*G06F 17/30* (2006.01)
(52) U.S. Cl.
CPC .. *G06F 17/30292* (2013.01); *G06F 17/30442* (2013.01)
(58) Field of Classification Search
CPC ......... G06F 17/30454; G06F 17/30592; G06F 17/30442; G06F 17/30292; G06F 17/30;
(Continued)

(56) References Cited

U.S. PATENT DOCUMENTS 4,626,829 A 12/1986 Hauck
5,109,226 A 4/1992 MacLean
(Continued)

FOREIGN PATENT DOCUMENTS

GB 2 306 868 A 5/1997

OTHER PUBLICATIONS

U.S. Appl. No. 13/590,110, filed Aug. 20, 2012, Office Action, dated Apr. 14, 2016.
(Continued)

*Primary Examiner* — Anh Ly
(74) *Attorney, Agent, or Firm* — Hickman Palermo Becker Bingham LLP

(57) ABSTRACT

Techniques are described herein for using a dynamic dictionary encoding with an associated hash table to support many-to-many join and aggregation operations. In an embodiment, within a first storage of a computing device, a first data structure that comprises a first dense grouping key column is created. The dense grouping key column includes a first plurality of dense grouping key values and one or more instances of a flag value. Within the first storage of the computing device, a second data structure is created that comprises a group-by column and a second dense grouping key column. The group-by column includes a plurality of group-by key values and the second dense grouping key column includes a second plurality of dense grouping key values. Within the first storage of the computing device, a third data structure, a hash table, is created that includes a hash bucket for each join key value that corresponds to an instance of the flag value. A result set for a query is determined using a combination of the first data structure, second data structure and/or the third data structure.

16 Claims, 7 Drawing Sheets

(58) Field of Classification Search
CPC .......... G06F 17/3033; G06F 17/30917; G06F 17/30598; G06F 9/30036; G06F 17/30412; G06F 17/30342; G06F 17/30501

See application file for complete search history.

(56) References Cited

U.S. PATENT DOCUMENTS

| | | | |
|---|---|---|---|
| 5,175,810 A | 12/1992 | Young et al. | |
| 5,287,193 A | 2/1994 | Lin | |
| 5,511,190 A | 4/1996 | Sharma et al. | |
| 5,592,622 A | 1/1997 | Isfeld | |
| 5,613,142 A * | 3/1997 | Matsumoto | G06F 7/36 707/E17.004 |
| 5,655,080 A | 8/1997 | Dias et al. | |
| 5,675,382 A | 10/1997 | Bauchspies | |
| 5,696,956 A | 12/1997 | Razdan et al. | |
| 5,696,959 A | 12/1997 | Guttag | |
| 5,706,495 A | 1/1998 | Chadha et al. | |
| 5,884,299 A | 3/1999 | Ramesh | |
| 5,884,229 A | 5/1999 | Ramesh et al. | |
| 6,065,070 A | 5/2000 | Johnson | |
| 6,118,724 A | 9/2000 | Higginbottom | |
| 6,178,405 B1 | 1/2001 | Ouyang | |
| 6,219,457 B1 | 4/2001 | Potu | |
| 6,331,826 B1 | 12/2001 | Wagner | |
| 6,336,180 B1 | 1/2002 | Long | |
| 6,381,601 B1 | 4/2002 | Fujiwara et al. | |
| 6,416,410 B1 | 7/2002 | Abou-Samra | |
| 6,779,105 B1 | 8/2004 | Bouyoux | |
| 6,829,697 B1 | 12/2004 | Davis et al. | |
| 6,996,569 B1 | 2/2006 | Bedell et al. | |
| 7,020,661 B1 | 3/2006 | Cruanes | |
| 8,145,642 B2 * | 3/2012 | Cruanes | G06F 17/30498 707/745 |
| 8,244,780 B1 | 8/2012 | Narayanan | |
| 8,667,252 B2 | 3/2014 | Colavin et al. | |
| 9,432,298 B1 | 8/2016 | Smith | |
| 9,658,675 B1 | 5/2017 | Witek | |
| 9,672,248 B2 * | 6/2017 | Attaluri | G06F 17/30466 707/E17.044 |
| 2001/0037345 A1 | 11/2001 | Kiernan et al. | |
| 2002/0032678 A1 | 3/2002 | Cornwell et al. | |
| 2002/0033762 A1 | 3/2002 | Belu | |
| 2003/0182464 A1 | 9/2003 | Hamilton | |
| 2003/0187858 A1 | 10/2003 | Kirk et al. | |
| 2004/0068642 A1 | 4/2004 | Tanaka | |
| 2004/0160446 A1 | 8/2004 | Gosalia | |
| 2005/0091256 A1 | 4/2005 | Rathakrishnan et al. | |
| 2006/0116989 A1 | 6/2006 | Bellamkonda et al. | |
| 2006/0117036 A1 * | 6/2006 | Cruanes | G06F 17/30498 707/E17.009 |
| 2006/0179255 A1 | 8/2006 | Yamazaki | |
| 2006/0218194 A1 | 9/2006 | Yalamanchi | |
| 2007/0074214 A1 | 3/2007 | Ueno | |
| 2008/0016031 A1 * | 1/2008 | Miao | G06F 17/30454 707/E17.044 |
| 2008/0059412 A1 * | 3/2008 | Tarin | G06F 17/30592 707/E17.004 |
| 2008/0086480 A1 | 4/2008 | Srivastava | |
| 2008/0086495 A1 | 4/2008 | Kizitunc | |
| 2008/0134213 A1 | 6/2008 | Alverson | |
| 2009/0055350 A1 | 2/2009 | Branish et al. | |
| 2009/0094193 A1 | 4/2009 | King et al. | |
| 2009/0287628 A1 | 11/2009 | Indeck | |
| 2009/0287637 A1 | 11/2009 | Day et al. | |
| 2009/0313210 A1 | 12/2009 | Bestgen et al. | |
| 2010/0030728 A1 | 2/2010 | Chakkappen et al. | |
| 2010/0082705 A1 | 4/2010 | Bhashyam et al. | |
| 2010/0106944 A1 | 4/2010 | Symes | |
| 2010/0161646 A1 | 6/2010 | Ceballos et al. | |
| 2010/0191918 A1 | 7/2010 | Lee et al. | |
| 2011/0106804 A1 | 5/2011 | Keeler et al. | |
| 2011/0119249 A1 | 5/2011 | Flatz | |
| 2012/0054225 A1 | 3/2012 | Marwah et al. | |
| 2012/0071152 A1 | 3/2012 | Roundtree | |
| 2012/0159448 A1 | 6/2012 | Arcese | |
| 2012/0166447 A1 | 6/2012 | Nice | |
| 2012/0197868 A1 | 8/2012 | Fauser | |
| 2012/0209873 A1 | 8/2012 | He | |
| 2012/0310916 A1 | 12/2012 | Abadi | |
| 2013/0151458 A1 | 6/2013 | Indeck | |
| 2014/0052713 A1 | 2/2014 | Schauer et al. | |
| 2014/0052726 A1 | 2/2014 | Amberg et al. | |
| 2014/0074818 A1 | 3/2014 | Barber | |
| 2014/0279838 A1 | 9/2014 | Tsirogiannis | |
| 2014/0372470 A1 * | 12/2014 | Attaluri | G06F 17/30979 707/769 |
| 2015/0046411 A1 | 2/2015 | Kazmaier | |
| 2016/0007037 A1 | 1/2016 | Zhao et al. | |
| 2016/0103880 A1 * | 4/2016 | Attaluri | G06F 17/30466 707/714 |
| 2016/0147451 A1 * | 5/2016 | Derby | G06F 3/0611 711/216 |
| 2016/0350347 A1 | 12/2016 | Das et al. | |
| 2017/0060587 A1 | 3/2017 | Chavan | |
| 2017/0109406 A1 | 4/2017 | Chavan | |
| 2017/0270052 A1 | 9/2017 | Brown et al. | |
| 2017/0270053 A1 | 9/2017 | Brown | |
| 2018/0004581 A1 | 1/2018 | Brown | |
| 2018/0067889 A1 | 3/2018 | Brown | |

OTHER PUBLICATIONS

U.S. Appl. No. 13/590,057, filed Aug. 20, 2012, Advisory Action, dated Feb. 26, 2015.
U.S. Appl. No. 13/590,057, filed Aug. 20, 2012, Final Office Action, dated Oct. 19, 2015.
U.S. Appl. No. 13/590,057, filed Aug. 20, 2012, Final Office Action, dated Nov. 18, 2014.
U.S. Appl. No. 13/590,057, filed Aug. 20, 2012, Notice of Allowance, dated Sep. 30, 2016.
U.S. Appl. No. 13/590,0547, filed Aug. 20, 2012, Office Action, dated Apr. 22, 2015.
U.S. Appl. No. 13/590,110, filed Aug. 20, 2012, Final Office Action, dated Feb. 11, 2016.
U.S. Appl. No. 13/590,057, filed Aug. 20, 2012, Advisory Action, dated Mar. 27, 2015.
U.S. Appl. No. 13/590,110, filed Aug. 20, 2012, Office Action, dated Feb. 11, 2016.
U.S. Appl. No. 13/590,110, filed Aug. 20, 2012, Office Action, dated Jul. 1, 2014.
U.S. Appl. No. 13/590,110, filed Aug. 20, 2012, Office Action, dated Oct. 2, 2015.
U.S. Appl. No. 13/590,110, filed Aug. 20, 2012, Office Action, dated Dec. 18, 2013.
U.S. Appl. No. 13/590,110, filed Aug. 20, 2012, Notice of Allowance, dated Aug. 1, 2016.
U.S. Appl. No. 13/590,057, filed Aug. 20, 2012, Office Action, dated Jan. 7, 2014.
U.S. Appl. No. 13/590,057, filed Aug. 20, 2012, Office Action, dated Jul. 1, 2014.
Thekkath et al., "Separating Data and Control Transfer in Distributed Operating Systems", ASPLOS, San Jose, ACM, dated 1994, 10 pages.
O'Brien, Frank, "The Appollo Guidance Computer—Architecture and Operation", dated 2010, Springer, pp. 27-28, 54, 76 and 1414.
Anonymous:, "Hash Tabie—Wikipedia, the free encyclopedia", dated Jun. 20, 2012, retrieved from the internet: http://wayback.archive.org/wiki/harshtable, 18 pages.
Coprocessor Wizard, Platform Studio, http://www.xilinx.com/itp/xilinx10/help/platform_studio/ps_c_cpw_coprocessm_wizard.htm, 2008, 2 pages.
Binkert et al., "A Simple Integrated Network Interface for High-Bandwidth Servers", dated Jan. 2006, 22 pages.
Das, U.S. Appl. No. 14/806,614, filed Jul. 22, 2015, Office Action, dated Dec. 6, 2017.

(56) References Cited

OTHER PUBLICATIONS

Brown, U.S. Appl. No. 15/197,436, filed Jun. 29, 2016, Office Action, dated Nov. 29, 2017.
Das, U.S. Appl. No. 14/806,614, filed Jul. 22, 2015, Notice of Allowance, dated Mar. 20, 2018.
Das, U.S. Appl. No. 14/806,614, filed Jul. 22, 2015, Interview Summary, dated Jan. 17, 2018.
Chavan, U.S. Appl. No. 14/338,219, filed Jul. 22, 2014, Notice of Allowance, dated Sep. 25, 2017.
Chavan, U.S. Appl. No. 14/338,219, filed 047/22/2014, Interview Summary, dated Sep. 11, 2017.
Brown, U.S. Appl. No. 15/074,248, filed Mar. 18, 2016, Office Action, dated Sep. 25, 2017.
Brown, U.S. Appl. No. 15/073,905, filed Mar. 18, 2016, Office Action, dated Sep. 25, 2017.
Schlegel et al., "Fast Integer Compression Using SIMD Instructions", dated 2010, ACM, 7 pages.

\* cited by examiner

← 101

| City | Amount |
|---|---|
| Boston | 100 |
| New York | 300 |
| Springfield | 80 |
| Los Angeles | 70 |
| Springfield | 100 |
| Chicago | 100 |
| Springfield | 500 |
| Albany | 200 |

← 104

| CID | Amount |
|---|---|
| 4 | 100 |
| 1 | 300 |
| 6 | 80 |
| 2 | 70 |
| 6 | 100 |
| 8 | 100 |
| 6 | 500 |
| 9 | 200 |

← 102

| Country | State | City | CID |
|---|---|---|---|
| USA | Massachusetts | Boston | 4 |
| USA | California | Los Angeles | 2 |
| USA | Illinois | Springfield | 6 |
| USA | Illinois | Chicago | 8 |
| Australia | Queensland | Springfield | 6 |
| USA | California | Springfield | 6 |
| USA | New York | New York | 1 |
| USA | New York | Albany | 9 |
| USA | Kentucky | Springfield | 6 |

| Country | State | City | CID |
|---|---|---|---|
| USA | Massachusetts | Boston | 4 |
| USA | California | Los Angeles | 2 |
| USA | Illinois | Springfield | 6 |
| USA | Illinois | Chicago | 8 |
| Australia | Queensland | Springfield | |
| USA | California | Springfield | 6 |
| USA | New York | Albany | 1 |
| USA | New York | New York | 9 |
| USA | Kentucky | Springfield | 6 |

| | |
|---|---|
| | 1 |
| | 4 |
| | 3 |
| | 3 |
| | |
| | 4 |
| | 2 |
| | 2 |
| | 5 |

← 201

| State | DGK |
|---|---|
| Massachusetts | 1 |
| New York | 2 |
| Illinois | 3 |
| California | 4 |
| Kentucky | 5 |

USE OF DYNAMIC DICTIONARY ENCODING WITH AN ASSOCIATED HASH TABLE TO SUPPORT MANY-TO-MANY JOINS AND AGGREGATIONS

TECHNICAL FIELD

The technical field relates to densely grouping and aggregating dimensional data.

BACKGROUND

Database systems are often designed to maintain large amounts of information about a variety of entities, events, etc. The items about which a database maintains information may possess a variety of characteristics. Even database systems that do not yet contain large amounts of information are often designed to be scalable such that the database systems can be adapted to accommodate large amounts of information.

It is common for each row in a table to correspond to a single item. For example, each row in a table may correspond to a distinct sale. It is possible for the row about an item to have columns for every characteristic associated with the item. Thus, the row about a sale could have a column that stores the amount of the sale, the date of the sale, the store at which the sale occurred, the street address of that store, the city in which the store resides, the state in which the store resides, the item involved in the sale, the department to which the item belongs, the manager of that department, etc. However, storing all of the characteristics of an item within the row for the item results in an enormous amount of duplication. For example, the city and state of each store would be duplicated in the row for every sale made by that store. To avoid such duplication, the row for a particular item may merely include a key to a row of another table that has further information about the item. For example, the row for a particular sale may simply have a store_id, where the store_id is a key to separate table that has a row for each store and addition information about each store (e.g. city, state, etc.). A schema in which one table (a "fact table") has one row per item, where the row for each item includes keys to one or more other tables (dimension tables) that contain characteristics of the item, is referred to as a star schema.

Aggregation queries that are run against data that is organized in a star schema typically specify a join key, and a grouping key. The join key determines which row in a dimension table should be combined with a given row in the fact table. For example:
select * from F, D
where F.city_id=D.city_id
group by D.state.
This query indicates that each row in fact table F should be joined with the row in dimension table D that has the same value for "city" as the fact table row. Further, once the rows from the fact table are joined to the appropriate rows in the dimension table, the rows should be divided into groups based on state.

In many cases, there is a many-to-one relationship between rows in a fact table and rows in a dimension table. That is, based on the join key, there is no more than one row in the dimension table with which any given fact table row will join. However, that is not always the case. In situations where a single row from the fact table may join with multiple rows in the dimension table, the database server must be able to perform many-to-many join and aggregation operations. For example, assume that information about sales per geographical location and additional information about the geographical location is split between a sales table (the fact table) and a geography table (a dimension table). The sales table comprises information about sales of a product and names of cities where the sales occur and the geography table comprises information about cities, and states and countries within which they are located.

Two or more states may have cities with the same name. Consequently, in the geography table, multiple rows may have the same city name (with different state and/or country values). For example, Pennsylvania, Colorado, Kansas, Illinois, Michigan and North Dakota all have cities named Erie. Thus, five rows of the geography table may have the city name 'Erie' and the value in the "state" column for each of the five rows will be a different state name from states Pennsylvania, Colorado, Kansas, Illinois, Michigan and North Dakota. The geography table may also have city names of other cities in those five states associated with their respective states. Under these circumstances, assume that the sales table has one or more rows where the city name is "Erie". Each of those rows will have its respective sales amount. Under these circumstances, when the join key is "city", rows in the fact table will have a many-to-many relationship relative to the rows with which they join in the dimension table. Therefore, any query that specifies a join and/or aggregation operation between the sales table and the geography table, where the join key is "city", requires a database server to process a many-to-many join and/or aggregation operations for data of sales and geography tables.

One current approach for performing many-to-many join and aggregation operations is to perform a hash join using hash tables. A "hash join" operation, generally speaking, comprises two phases. In the first phase, known as the "build phase," the database server generates a hash table by hashing each row of the first table according to a hash function on the join column(s). In the second phase, known as the "probe phase," the database server then iteratively scans through each row of the second table. For each row in the second table, the database server uses the hash function and the hash table to identify rows in the first table with equivalent join column values. When matching rows are identified, the rows are merged and added to the result set for the join operation, assuming the rows also match any applicable join predicates. One technique for performing hash join operations is described in U.S. Pat. No. 8,825,678, issued Sep. 2, 2014, the contents of which are incorporated herein by reference.

When both tables in the join operation are relatively large, the database server may be unable to fit a hash table for the entire first table into memory. In such situations, the tables may be partitioned and the database server may perform nested loops with respect to the partitions. However, the two phased approach remains essentially the same during each iteration of the loop. Thus, using hash tables to perform many-to-many join operations in this manner is inefficient as it requires a significant amount of memory. Therefore, database systems that contain large amounts of information suffer significant performance degradation when performing many-to-many join and aggregation operations.

BRIEF DESCRIPTION OF THE DRAWINGS

In the drawings:

FIG. 1 illustrates an example arrangement of data according to an example star schema.

FIG. 2 illustrates an example of dense grouping keys and a data structure comprising dense grouping keys that may be created based on the example data of FIG. 1.

DETAILED DESCRIPTION

Figure 3A:
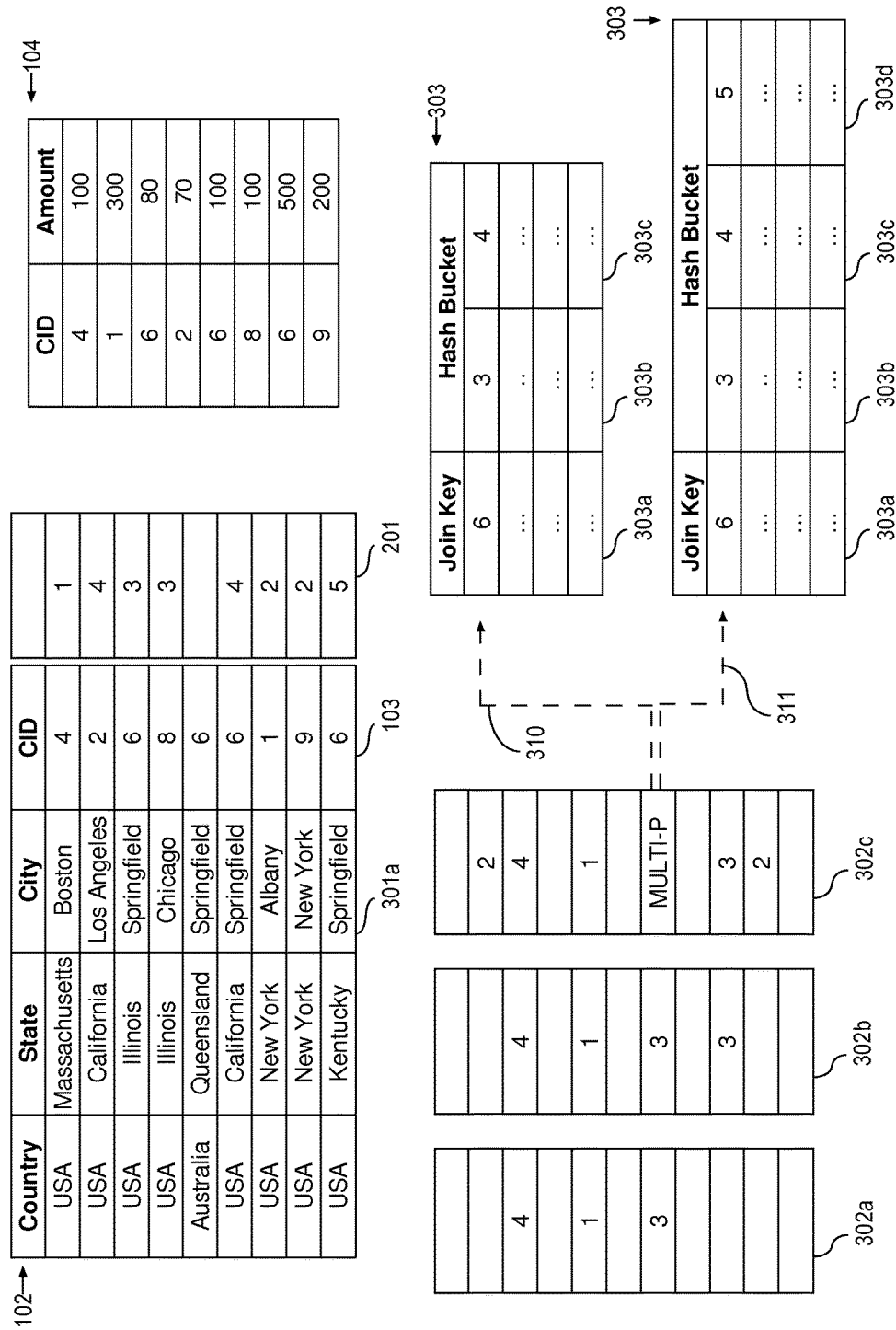
FIG. 3A illustrates an example of a data structure that is a fast dictionary for many-to-many relation data.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for processing of many-to-many join and aggregation operations. Rather than perform a convention hash join, a "vector structure" is used in conjunction with a hash table, as shall be described in greater detail hereafter. In one embodiment, the vector structure maps join keys to grouping keys, as long as the join keys map to a single grouping key. For example, if the join key "Los Angeles" only maps to "California", then the vector structure would have an entry that maps "Los Angeles" to a value that represents "California".

However, as mentioned above, in many-to-many joins, some join keys may map to multiple grouping keys. For example, the join key "Erie" maps to the grouping keys "Pennsylvania", "Colorado", "Kansas", "Illinois", "Michigan" and "North Dakota". For each join key that maps to multiple grouping keys, the vector structure entry for the join key is marked as "multi-parent". Thus, rather than map to a value that represents any single state, the vector structure would map "Erie" to the value that indicates "multi-parent".

According to one embodiment, a hash table is built on the multi-parent join keys. In the present example, an entry would be added to the hash table to associate the join key "Erie" with values that represent the grouping keys "Pennsylvania", "Colorado", "Kansas", "Illinois", "Michigan" and "North Dakota". Similar entries would be added to the hash table for each multi-parent join key.

According to one embodiment, in both the vector structure and the hash table, group by keys are represented by "dense grouping keys". In one embodiment, a dense grouping key is an integer value that uniquely represents a grouping key. For example, "California", "Pennsylvania", "Colorado", "Kansas", and "Illinois" may be respectively assigned the dense grouping keys of 1, 2, 3, 4 and 5. The use of dense grouping keys to represent grouping key values, rather than the grouping key values themselves, typically makes processing more efficient.

According to one embodiment, the vector structure and associated hash table are built when processing a query that specifies a join operation, in response to the database server determining that the join is a many-to-many join. For example, the database server may begin by creating a vector structure in which each entry maps a join key to a value that represents a single group key. If at any point during the building of the vector structure the database server detects that a join key maps to more than one grouping key, then database server marks the entry as multi-parent, creates an associated hash table, and adds an entry to the hash table that associates the multi-parent join key with the various grouping keys to which it maps.

Structural and Functional Overview

FIG. 1 illustrates an example arrangement of data according to an example star schema. The star schema depicted in FIG. 1 comprises a fact table 101 and a dimension table 102. Fact table 101 contains data related to sales that occurred for a business. Specifically, each row in fact table 101 comprises information about amount of units sold of a particular product, and the city in which the sale occurred. Dimension table 102 comprises information about cities where a product may be sold, the state in which the city is located and the country in which the state and the city is located.

To avoid consuming a large amount of storage by repeating the entire city names in the fact table, each city name may be assigned a unique numerical value. In FIG. 1, column 103 contains an identifier for each city name. Specifically, in dimension table 102, "Boston" is associated with numerical identifier 4, "Los Angeles" is associated with numerical identifier 2, "Chicago" with numerical identifier 8, "New York" with numerical identifier 1, "Albany" with numerical identifier 9, and "Springfield" with the numeric identifier 6. Significantly, there are multiple rows within table 102 that are for cities with the name "Springfield". Even though these rows represent distinct cities, each of the "Springfield" rows has the same numerical identifier (i.e. "6") because the identifier merely corresponds to the city name, and are not necessarily unique to the cities themselves.

Once numerical identifiers have been established for each city name, the fact table may save space by storing numerical city identifiers rather than full city names. For example, fact table 104 is a version of fact table 101 in which the city name column has been replaced with a city name identifier column. Thus, in fact table 104 each row has (a) an identifier of a city and (b) an amount sold in the city whose name is represented by the identifier.

The number of transactions in fact table 104 (or fact table 101) may be significantly greater than the number of cities in dimension table 102. Fact table 104 does not have to contain detailed information about the cities, since dimension table 102 has that detailed information.

Fact tables comprise at least one column of foreign key values for each dimension in the star schema. The star schema illustrated in FIG. 1 has one dimension, represented by dimension table 102. Consequently, fact tables 101 and 104 each have one column of foreign key values, "City" column and "CID" column, respectively, for the "city" dimension. Each value in the foreign key column of fact table is also stored in the dimension table. In FIG. 1, each value in the foreign key column is also stored in the dimension table 102.

Dense Grouping Keys

FIG. 2 illustrates an example of dense grouping keys and a data structure comprising dense grouping keys that may be created based on data of a dimension table. For the purpose of illustrating a clear example, dimension table 102 depicted in FIG. 1 is used in illustrating the example of creating a dense data structure based on data of a dimension table.

Queries that specify aggregation operations identify one or more group-by column(s). The database server creates a dense grouping key for each unique combination of values, from those group-by columns, that appears in any row of the table. A unique combination of values, from those group-by columns, that appears in any row of the table, is referred to herein as a "group-by key value".

Dense grouping keys may be a set of contiguous numeric or non-numerical values. In an embodiment, dense grouping keys are a sequence of consecutive numbers and all dense grouping key values have a fixed size. For example, if dense grouping key values are a series of integer values, then each dense grouping key value will be the size of an integer data type. Multiple rows of a dimension table may be represented or indicated by a single dense grouping key.

Join Back Table

As used herein, the term "join back table" refers to a data structure that comprises one or more dense grouping keys and corresponding group-by key value or set of group-by key values. In an embodiment, the join back table comprises two or more columns for dense grouping keys and corresponding group-by key values. In an embodiment, each entry of the join back table comprises a different dense grouping key and the corresponding group-by key value or set of group by key values.

In an embodiment, the join back table is a temporary table that is created only for a query and is discarded after the query is successfully processed.

Creation of Dense Grouping Keys and Join Back Table

Dense grouping keys_may be created based on the database server receiving a query such as:
QUERY 1:
SELECT g.state, sum (s.amount)
FROM sales s, geog g
WHERE g.CID=s.CID AND g.country='USA'
GROUP BY g.state The database server may identify the one or more columns indicated by the GROUP BY criteria specified in a query as the column or columns relevant for computing the aggregation operation. The database server, may then determine the dense grouping keys for the relevant column or columns and also determine the number of dense grouping keys and for each dense grouping key, the corresponding value or values in the one or more columns indicated by the GROUP BY criteria.

In QUERY 1, table "sales" is a fact table and "geog" is a dimension table. For the purposes of illustrating a clear example, table "sales" is represented by fact table 101 or 104 of FIG. 1, and table "geog" is dimension table 102 represented in FIG. 1 and FIG. 2

In an embodiment, the database server identifies one of the tables specified in a query to be a fact table based on certain metrics associated or corresponding to the tables. For example, if a database server determines that the size of one of the tables is substantially larger than other tables, then the database server identifies the large table as fact table, and identifies the smaller tables as dimension tables.

The database server may determine and create dense grouping keys for the relevant column or columns, and the join back table used in grouping dimensional data and/or aggregating dimensional data that has many-to-many relationship, by executing the following example query:
QUERY 2:
CREATE TEMPORARY TABLE tt_geog as
SELECT max(g.state), keyvec_create( ) dgk
FROM geog g
WHERE g.country='USA'
GROUP BY g.state QUERY 2 represents an example query that may be executed for each dimension table specified in the GROUP BY clause of QUERY 1 or for each dimension table whose columns are specified in the GROUP BY clause of QUERY 1.

The database server by executing the keyvec_create( ) function of QUERY 2 creates a dense grouping key for each unique value that satisfies the grouping criteria specified by the GROUP BY clause. Thus a unique dense grouping key is created for each unique group-by key value of the "state" column of dimension table 102.

Dense grouping keys are created for only the rows with values of a dimension table that are actually used in determining a result set. Therefore, the rows represented by dense grouping keys are rows with values that satisfy a filtering criteria. Thus, the number of rows represented by a dense grouping key are reduced from all possible rows of the dimension table to only those rows of the dimension table that are actually used.

Therefore, prior to creating a dense grouping key for a particular group-by key value, QUERY 2 also ensures that filtering criteria of QUERY 2 is satisfied by the row of the particular group-by key value. The filtering criteria of QUERY 2 is specified by the WHERE clause and it requires that the value in the "country" column of the dimension table 102 is 'USA'. Consequently, dense grouping keys are created only for unique group-by values from rows that have a value of 'USA' in the country column of dimension table 102.

For example, in FIG. 2, dimension table 102 includes 'Massachusetts' in the "State" column of row one, and QUERY 2, prior to creating a dense grouping key for 'Massachusetts', determines whether "Country" value associated with 'Massachusetts' is indeed 'USA', thus satisfying the filtering criteria. In dimension table 102, the "Country" value associated with 'Massachusetts' is indeed 'USA', therefore a dense grouping key is created for 'Massachusetts'. However, for 'Queensland', a dense grouping key is not created because the "Country" value associated with 'Queensland' is 'Australia', thus the row of group-by key value 'Queensland' does not have a value of 'USA' in the "country" column of dimension table 102, thereby failing the filtering criteria.

In the example of QUERY 2 the temporary table tt_geog is the join back table. In FIG. 2 data structure 202 is the join back table. The join back table 202 comprises a column of dense grouping keys, indicated by column name "DGK", and a column of group-by key values, indicated by "State". Each entry of the join back table 202 comprises a different dense grouping key and the corresponding group-by key value.

The database server by executing the keyvec_create( ) function of QUERY 2 also associates each dense grouping key within the join back table 202 with a row in the dimension table 102 based on that dense grouping key's corresponding group-by key value. The database server may create a data structure such as array 201 to store the associations between each row of the dimension table and a dense grouping key. Each row of the dimension table is an index into the array. Array 201 starts from zero index, therefore, the first row of dimension table corresponds to the first position of the array as depicted in FIG. 2.

In FIG. 2, since the corresponding dimension table 102 value of dense grouping key 1 is 'Massachusetts' in join back table 202, each row of dimension table 102 with 'Massachusetts' as the "State" column value will be associated with dense grouping key 1, as indicated by the first position of the array 201. The corresponding dimension table 102 value of dense grouping key 2 is 'New York' in join back table 202, thus rows seven and eight of dimension table 102 are associated with dense grouping key 2, as indicated by positions seven and eight of array 201.

The corresponding dimension table 102 values of dense grouping keys 3, 4, 5, are Illinois, California, and Kentucky, respectively, in join back table 202. Therefore, rows two and six of dimension table 102 are associated with dense grouping key 4, rows three and four of dimension table 102 are associated with dense grouping key 3, and row nine of dimension table 102 is associated with dense grouping key 5. These associations are represented in array 201 by positions two and six for dense grouping key 4, positions three and four for dense grouping key 3, and position nine for dense grouping key 5.

In an embodiment, the database server may create a temporary dimension table with an additional column, where each row in the additional column comprises a dense grouping key associated with that row of the dimension table.

The database server by executing keyvec_create ( ) function also creates a data structure that is a fast dictionary capable of handling data with many-to-many relationship. Such data structures are described in FIGS. 3A and 3B.

Fast Dictionary Capable of Handling Many-to-Many Relation Data

Figure 3B:
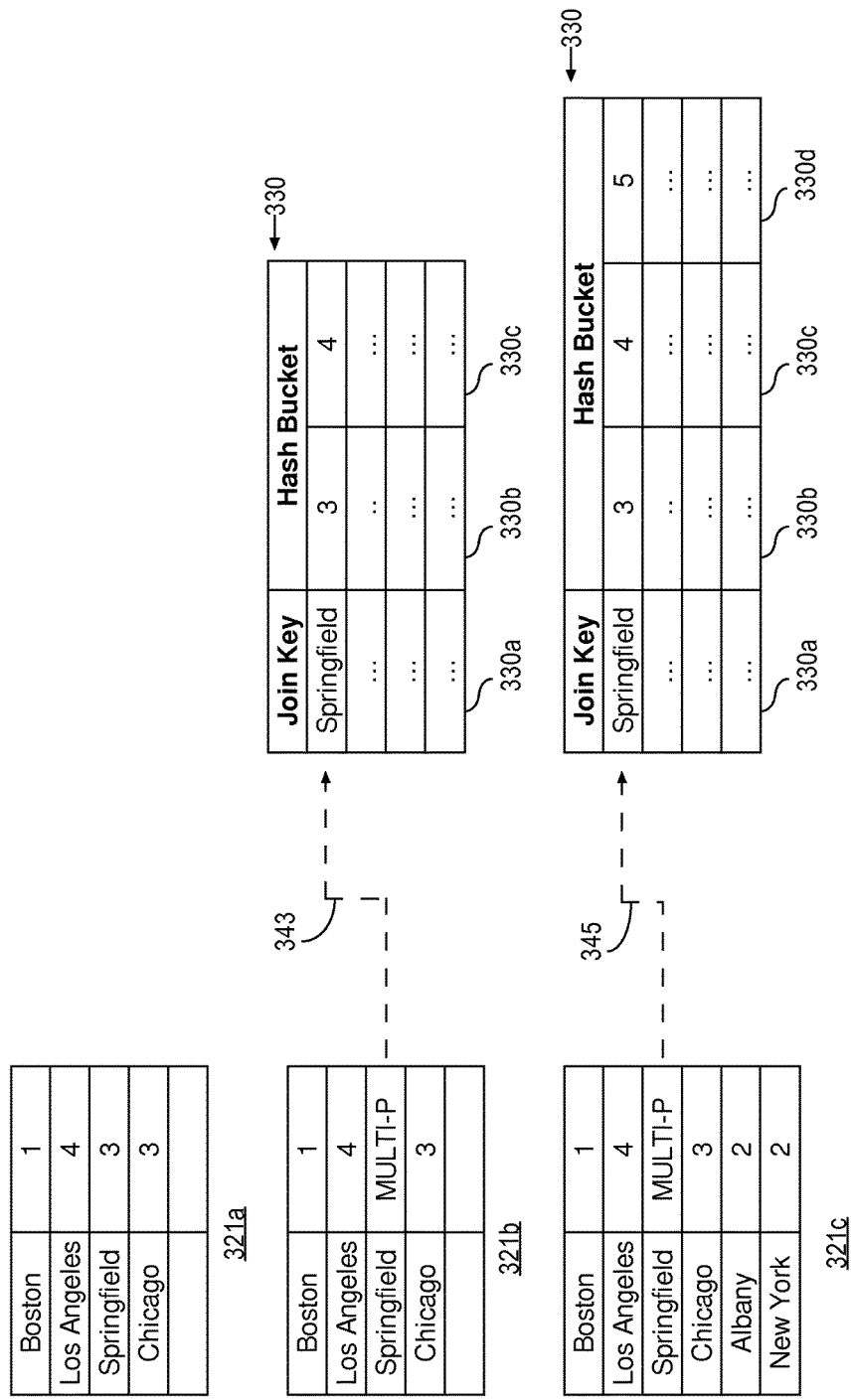
FIG. 3B illustrates another example of a data structure that is a fast dictionary for many-to-many relation data.

FIG. 3A and FIG. 3B illustrate examples of data structures that are fast dictionaries that support processing of many-to-many relation data. For the purpose of illustrating a clear example, data, tables and data structures described and depicted in FIG. 1 and FIG. 2 are used. Additionally, for the purpose of illustrating a clear example, QUERY 1 and QUERY 2 will continue to be used and are reproduced here:
QUERY 1:
SELECT g.state, sum (s.amount)
FROM sales s, geog g
WHERE g.CID=s.CID AND g.country='USA'
GROUP BY g.state
QUERY 2:
CREATE TEMPORARY TABLE tt_geog as
SELECT max(g.state), keyvec_create( ) dgk
FROM geog g
WHERE g.country='USA'
GROUP BY g.state The database server, by executing keyvec_create( ) also creates a data structure where different entries of the data structure correspond to different join key values and a dense grouping key corresponding to the join key value. The join key values used in creating the data structure are specified by the join key column of the WHERE clause of QUERY 1. The join key column specified in QUERY 1 is the CID column of sales fact table 104 and CID column, column 103, of geog dimension table 102 depicted in FIG. 3A.

The data structure created is depicted by data structures, 302a, 302b, 302c in FIG. 3A. Data structures 302a, 302b, 302c are the same data structure depicted at different points in time. In an embodiment, if join key values are numeric or if a numeric value can be associated with a non-numeric join key value, then the data structure created by the database server may be an array. Use of an array to store a dense grouping key for the corresponding join key may allow the database server to benefit from the fast read and write operations that can be performed on an array data structure.

In QUERY 1, the values of the specified join key column are numeric. Therefore, in FIG. 3A, the data structure created is an array depicted by arrays 302a, 302b, 302c. Arrays 302a, 302b, 302c are the same array depicted at different points in time. The size of the data structure is based on the number of join key values. If a filtering criteria is specified, then only rows of the dimension table that satisfy the filtering criteria will be considered for the array. For example, QUERY 2 specifies a filtering criteria that requires the value in the "Country" column of a row in the dimension geog to comprise 'USA'. Therefore, only join key values of rows in the dimension geog that satisfy the filtering criteria will be considered for the array represented by arrays 302a, 302b, 302c.

As described above, dimension geog, for the purpose of example queries QUERY 1 and QUERY 2 is depicted by dimension table 102, also illustrated in FIG. 3A. In FIG. 3A, based on the data of dimension table 102, all rows except for the row where the "Country" value is 'Australia' will be considered for the array represented by arrays 302a, 302b, 302c.

Each join key value of CID column in table 104 and dimension table 102 is an identifier for a unique value in the City column, column 301a, of dimension table 102. Therefore, each value in the City column, column 301a, of dimension table 102 has a corresponding value in the CID column, column 103, in dimension table 102. For example, 'Boston' has corresponding CID value of '4', and similarly 'Springfield' has a CID value of '6'.

In FIG. 3A, the numeric values of join key column CID may be used as index into the array, represented by arrays 302a, 302b, 302c, for storing the corresponding dense grouping key of the join key value. For example, the first row of join key column CID, column 103, of dimension table 102 has a numerical value of 4. Thus, the dense grouping key associated with the first row of dimension table 102 will be stored in the fourth position of the array, as depicted in array 302a, 302b, 302c. In some embodiments, the size of the array may be based on the maximum value among the values of the join key column. In FIG. 3A, data structure 302a, 302b, 302c are arrays of size 10. In an embodiment, the size of the array may be based on the maximum value among the values of the join key column whose rows also satisfy a filtering criteria if specified.

Using the numerical values of the join key column, each row satisfying the filtering criteria specified in QUERY 2 is processed and the dense grouping key associated with the processed row is stored in array 302a at the location indicated by the numerical value of the join key column. For example, in FIG. 3A, as described above, at the fourth position of array 302a, the dense grouping key associated with first row of dimension table 102, dense grouping key value of '1' will be stored. Similarly, at the second position of array 302a, the dense grouping key value '4' is stored.

If join key values of the join key column of a dimension table do not provide a unique constraint on the dimension table such that one join key value corresponds to only one group-by key value, then the dense grouping key in the array corresponding to the join key value that occurs more than once within the join key column is replaced with a flag value that indicates that a hash table associated with the array should be used in performing join and aggregation operations.

For example, CID value '6' in dimension table 102 is associated with more than one dense grouping key. Therefore, the first time the CID value '6' is processed (the third row of dimension table 102), at the sixth position of array 302b, the corresponding dense grouping key value for the third row of dimension table 102 is stored. The second time the CID value '6' is processed, that is when the sixth row of the CID column of dimension table 102 is processed, the dense grouping key at the sixth position of array 302b is changed to a flag value as depicted in array 302c. Additionally, a hash table is created that includes the join key value that is associated with more than one dense grouping key and each of the corresponding dense grouping keys of the join key value as hash buckets.

In FIG. 3A, process 310 depicts the creation of hash table 303 where join key value of '6', depicted in first row of column 303a, is associated with a list of hash buckets, 303b, 303c comprising corresponding dense grouping keys 3 and 4 respectively. The third time the CID value '6' is processed, that is when the ninth row of the CID column of the geog dimension table 102 is processed, the dense grouping key at the sixth position of array 302c still remains the flag value and an additional hash bucket 303d is added to the list of hash buckets in the hash table for join key value '6'.

Array 302c illustrates how the array comprising dense grouping keys looks after all join key values that will actually be used in determining the result set of a query are processed. Array 302c also illustrates an example of a fast dictionary that can support processing many-to-many relation data.

FIG. 3B, illustrates an example of data structure that is fast dictionary that can support processing many-to-many relation data when the join key value is non-numeric and a corresponding numeric value for the join key value cannot be determined.

If the join key value is non-numeric, then a data structure may be created such that each entry in the data structure is the join key value and the corresponding dense grouping key. In FIG. 3B, data structures 321a, 321b, 321c are different versions of the same data structure, a table with two columns, one for a join key column and the other for the corresponding dense grouping key column, at different points in time. Tables 321a, 321b, 321c may be created based on the database server receiving a query, like the example query below, that specifies:

QUERY 3:
SELECT g.state, sum (s.amount)
FROM sales s, geog g
WHERE g.City=s.City AND g.country='USA'
GROUP BY g.state The join key column specified in QUERY 3 is "City" of geog dimension table 102 and "City" of sales fact table 101. In creating the data structure, represented by tables 321a, 321b, 321c, each row of the join key column specified in QUERY 3 is processed and the join key column value and the corresponding dense grouping key is stored, as illustrated by tables 321a, 321b, 321c. A join key value associated with more than one dense grouping key is processed similar to the way described in FIG. 3A. Hash table 330 includes the join key value, represented by column 330a, that is associated with more than one dense grouping key and each of the corresponding dense grouping keys of the join key value as hash buckets, represented by columns 330b, 330c, 330d.

Using Dense Grouping Keys and Data Structure for Aggregation

Figure 4:
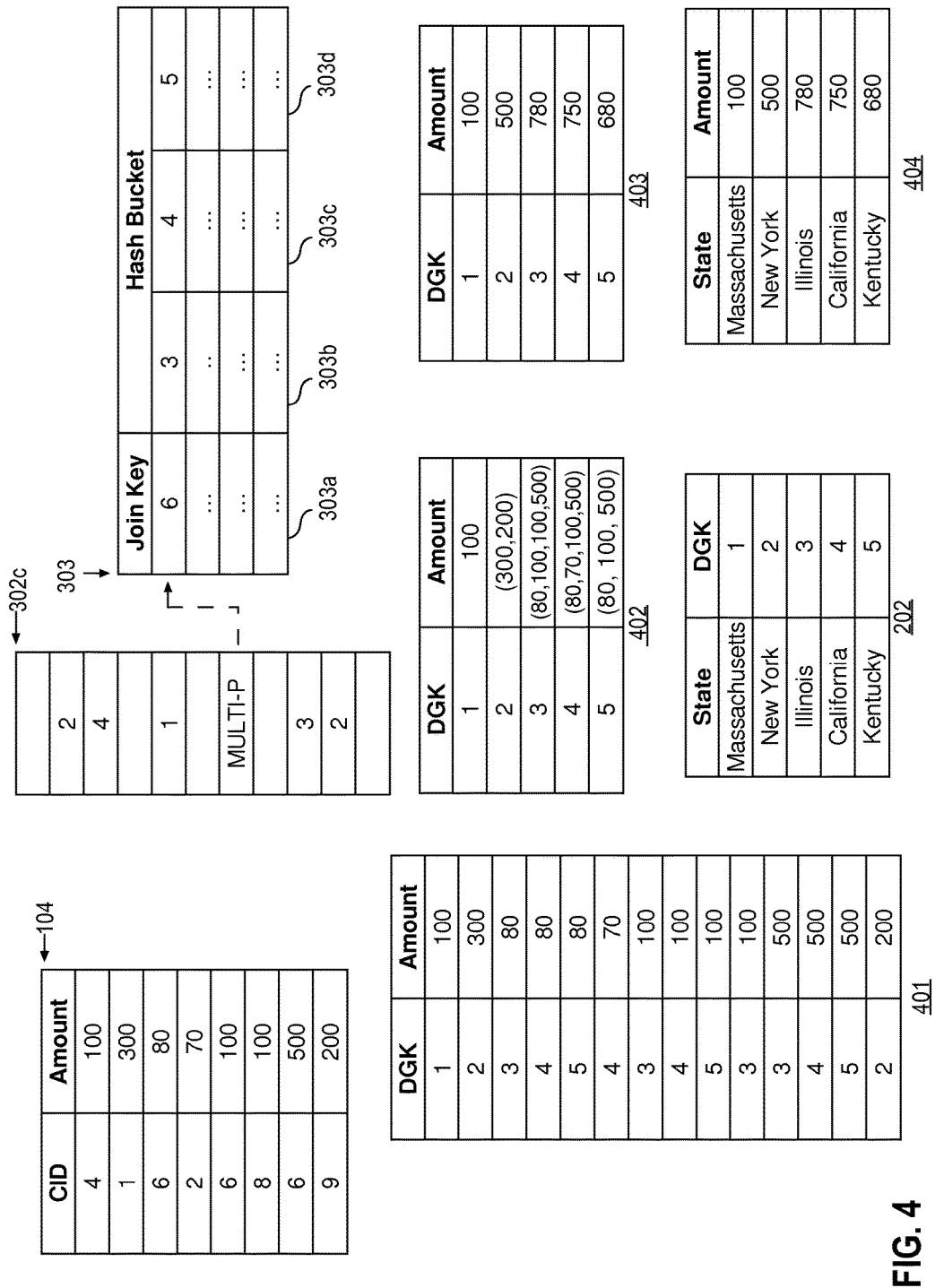
FIG. 4 illustrates an example of data structures created to store aggregate data gathered from the fact table.

FIG. 4 illustrates an example of data structures created to store aggregate data gathered from the fact table. For the purpose of illustrating a clear example, data, tables and data structures described and depicted in FIG. 1 and FIG. 2 are used. Additionally, for the purpose of illustrating a clear example, QUERY 1 and QUERY 2 will continue to be used.

In FIG. 4, array 302c is used to translate fact table 104 into fact table 401. QUERY 1 requires aggregation over the "Amount" column of the fact dimension table 102 as specified by sum (s.amount) in the query. QUERY 1 is reproduced here:

QUERY 1:
SELECT g.state, sum (s.amount)
FROM sales s, geog g
WHERE g.CID=s.CID AND g.country='USA'
GROUP BY g.state QUERY 1 may be rewritten in order to take advantage of dense grouping keys and data structures created and described above in FIG. 2 and FIG. 3A. The database server may rewrite QUERY 1 as following:

QUERY 1-A:
SELECT keyvec_use (CID), sum(amount)
FROM sales
WHERE keyvec_filter(CID)
GROUP BY keyvec_use (CID)

The rewritten QUERY 1, QUERY 1-A removes join operations until after aggregation of data is performed. Thus, the number of rows over which a join operation will need to be performed will be greatly reduced.

Using QUERY 1-A, the join key values of the join key column of the sales fact table 104 is translated into their corresponding dense grouping keys as shown in translated sales table 401. Each row of the sales fact table 104 is processed and based on array 302c, corresponding dense grouping key of a join key value is determined. For example, the first row of the sales fact table 104 comprises a value of '4' in the join key column, "CID" column. The database server may map the join key value of 4 into its corresponding dense grouping key by determining the value stored in the fourth position of array 302c. The fourth position of array 302c comprises a value of 1, therefore, the dense grouping key for a join key value of 4 is 1 in the example illustrated in FIG. 4.

The second row of the sales fact table 104 comprises a value of 1 in the join key column. Based on array 302c, the dense grouping key stored at the first position of array 302c is 2, therefore the corresponding dense grouping key for join key value of 1 is 2. Translated sales table 401 reflects this translation in the second row.

The third row of the sales fact table 104 comprises a value of 6 in the join key column. The dense grouping key stored at the sixth position of array 302c is the flag value 'MULTI-P' indicating that the join key value of '6' is associated with more than one dense grouping key. Based on the flag stored at the sixth position of array 302c, the server uses the hash table associated with array 302c, hash table 303, to determine the dense grouping keys for join key value '6'. Hash table 303 associated with array 302c, comprising of columns 303a, 303b, 303c, 303d, identifies that the join key value of '6' is associated with dense grouping keys 3, 4, and 5.

Therefore, translated sales table 401 stores one row for each dense grouping key associated with join key value '6' as reflected by the third, fourth and fifth rows translated sales table 401. This is the accurate result since join key column between sales table the geog table does not ensure a one-to-many relationship.

Similarly, the remaining rows of sales fact table 104 are processed and the join key values in the join key column of sales fact table 104 are translated into their corresponding dense grouping keys as illustrated by translated sales table 401.

Once join key values are translated into their corresponding dense grouping keys, aggregation specified by the fact query, QUERY 1 and translated into QUERY 1-A, will be performed. In an embodiment, using translated sales table 401, the dense grouping keys of translated sales table 401 can be grouped together such that all dense grouping keys with the same dense grouping key value can be collapsed into one row for the dense grouping key and the corresponding "Amount" values can be stored together, as depicted in data structure 402. In FIG. 4, QUERY 1 and QUERY 1-A require the aggregation to be SUM of the "Amount" values, therefore the summation of the amount values will be stored as depicted in data structure 403.

After desired aggregation of desired data is preformed, the join operation that were removed to be performed until after aggregation, by translated QUERY 1-A, will be performed. Using the join back table 202, described above, the corresponding State value for each dense grouping key in data structure 403 will be determined and the server may generate a result set including the corresponding State values and the aggregated amount, as depicted by data structure 404.

Figure 5:
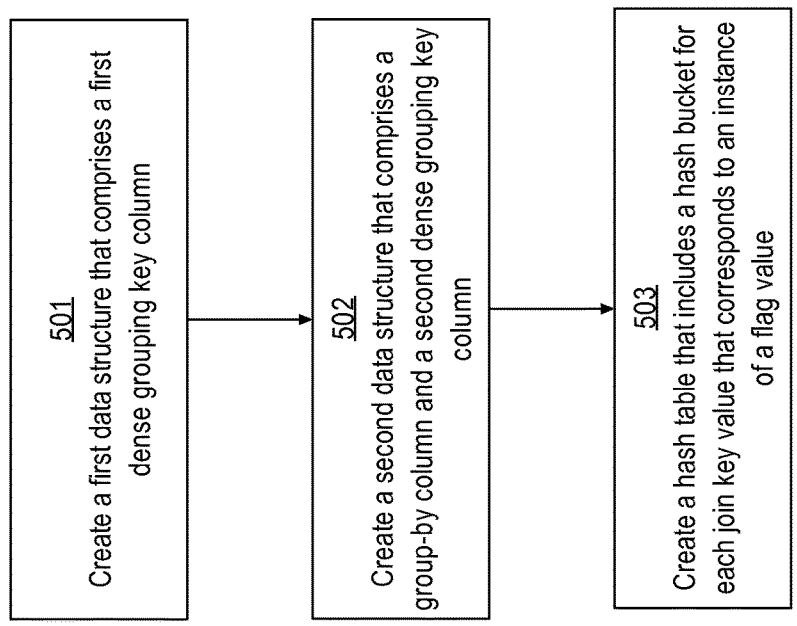
FIG. 5 illustrates a method of creating data structures that enable the use of a dynamic dictionary encoding with an associated hash table to support many-to-many joins and aggregations.

FIG. 5 illustrates a method of creating data structures that enable the use of a dynamic dictionary encoding with an associated hash table to support many-to-many join and aggregation operations.

In step 501, a first data structure is created that comprises a first dense grouping key column. In an embodiment, the first dense grouping key column includes a first plurality of dense grouping key values and one or more instances of a flag value. In an embodiment, each entry in the first data structure includes either one of the plurality of dense grouping key values or an instance of the flag value at a location within the first data structure. The location within the first data structure corresponds to a particular join key value from a plurality of join key values. In an embodiment, the first data structure may be array 302c, described above.

In step 502, a second data structure is created that comprises a group-by key column and a second dense grouping key column. The group-by key column may include a plurality of group-by key values and the second dense grouping key column may include a second plurality of dense grouping key values. In an embodiment, the second dense grouping key values and the first dense grouping key values are the same. In an embodiment, each entry in the second data structure includes one of the plurality of group-by key values and a corresponding one of the second plurality of dense grouping key values. In an embodiment, the second data structure may be the join table 202, described above.

In step 503, a hash table is created that includes a hash bucket for each join key value that corresponds to an instance of the flag value. Applying a hash function to a join key value that corresponds to an instance of the flag value may indicate a location of the hash bucket that corresponds to the join key value. In an embodiment, within the hash bucket for a given join key value, an indication of a plurality of dense grouping key values with which the join key value is associated is stored. In an embodiment, the hash table is hash table 303 with columns 303a, 303b, 303c, 303d, described above.

In an embodiment, a database server executing on a computing device receives a query that specifies a grouping operation that groups rows from a second table based on values from the first column of the first table and a join operation that joins rows from the second table based on the values from the second column of the first table. The second table may be a fact table and the first table may be a dimension table. Using data structures described in steps 501, 502, 503, a result set for the query is determined.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
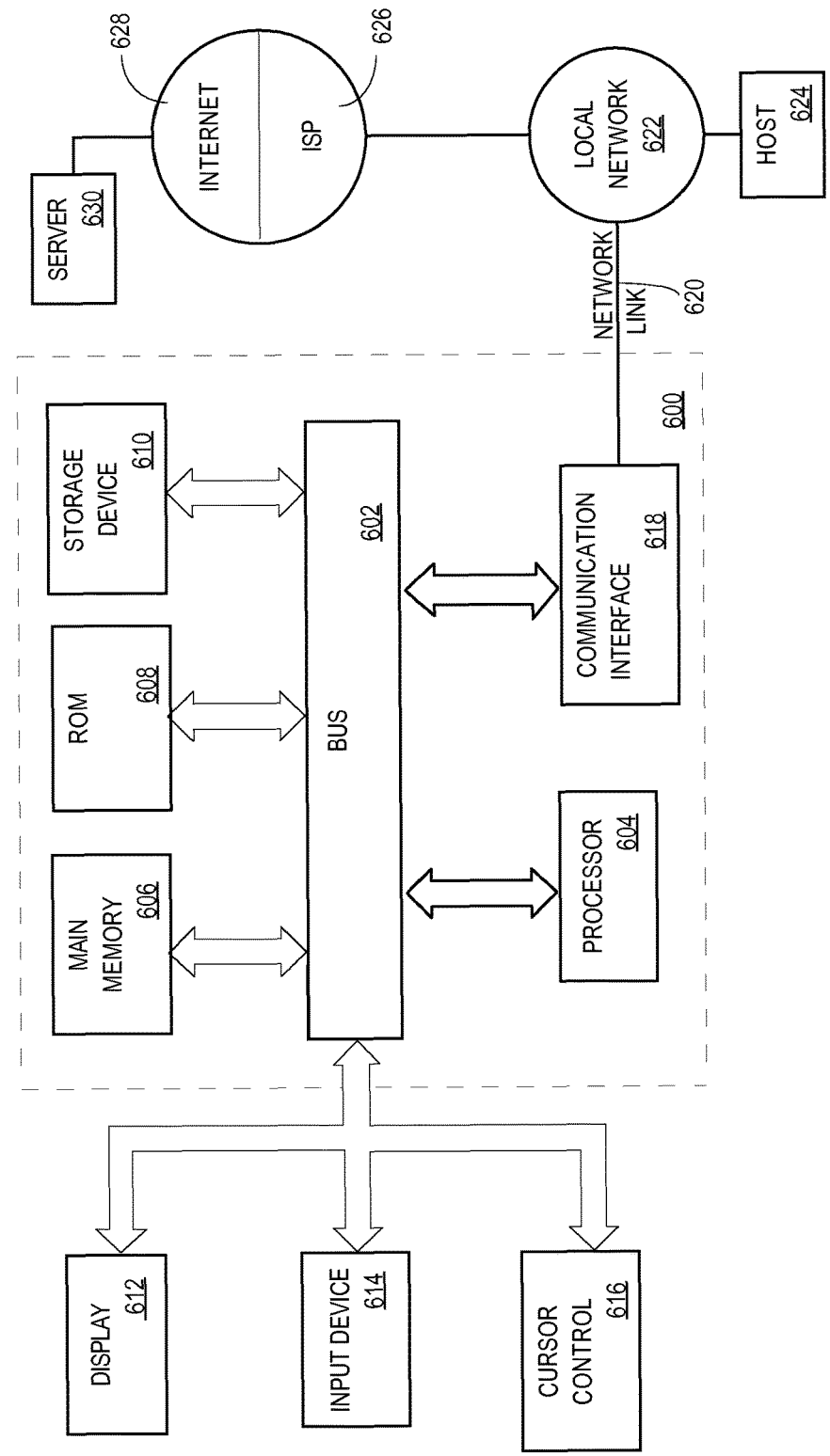
FIG. 6 illustrates an example computer system that may be specially configured according to the various embodiments described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving a query at a database server executing on a computing device;
   wherein the query specifies:
   a grouping operation that groups rows from a second table based on values from a grouped-by column of a first table;

a join operation that joins rows from the second table based on values from a joined-by column of the first table;
creating, within storage of the computing device, a dense grouping key value-to-join key (DGK-JK) value mapping data structure that comprises a first dense grouping key (DGK) column;
wherein the first DGK column includes a first plurality of dense grouping key (DGK) values and one or more instances of a flag value;
wherein each entry in the DGK-JK value mapping data structure includes either:
one of the first plurality of DGK values at a location within the DGK-JK value mapping data structure, wherein the location corresponds to a particular join key value from a plurality of join key values from the joined-by column of the first table, or
an instance of the flag value at the location within the DGK-JK value mapping data structure, wherein the location corresponds to the particular join key value from the plurality of join key values from the joined-by column of the first table;
creating, within the storage of the computing device, a dense grouping key value-to-grouping key (DGK-GK) value mapping data structure that comprises a grouping key column and a second dense grouping key (DGK) column;
wherein the grouping key column includes a plurality of group-by key values from the grouped-by column of the first table;
wherein the second DGK column includes a second plurality of DGK values;
wherein each entry in the DGK-GK value mapping data structure includes one of the plurality of group-by key values, and a corresponding one of the second plurality of DGK values;
creating, within the storage of the computing device, a multiple dense grouping key values-to-join key (multi-DGK-JK) value mapping data structure that is a hash table that includes a hash bucket for each join key value that corresponds to a respective instance of the flag value;
wherein applying a hash function to a given join key value that corresponds to a given instance of the flag value indicates a location of the hash bucket that corresponds to the given join key value;
within the hash bucket for the given join key value, storing an indication of a given plurality of DGK values with which the given join key value is associated;
using the multi-DGK-JK mapping structure, in the grouping operation, as a join-key value hash-based index to the given plurality of DGK values;
determining a result set for the query by performing the grouping operation and the join operation using the DGK-JK value mapping data structure and the multi-DGK-JK value mapping data structure, the DGK-JK value mapping data structure and the multi-DGK-JK value mapping data structure matching the plurality of join key values from the joined-by column of the first table with the second plurality of DGK values;
wherein the method is performed by one or more computing devices.

2. The method of claim 1 wherein the storage of the computing device is volatile memory of the computing device.

3. The method of claim 1, wherein DGK values are a series of contiguous values.

4. The method of claim 1, wherein the location within the DGK-JK value mapping data structure corresponds to a numerical value of the particular join key value.

5. The method of claim 1, further comprising:
determining, based on a total number of join key values from the plurality of join key values from the joined-by column of the first table satisfy a filtering criteria, size of the DGK-JK value mapping data structure.

6. The method of claim 1, wherein the plurality of join key values from the joined-by column of the first table are numerical values, further comprising:
determining, based on the maximum numerical value among the plurality of join key values, size of the DGK-JK value mapping data structure.

7. A method comprising:
creating, within storage of a computing device, a first data structure that comprises a first dense grouping key column;
wherein the first dense grouping key column includes a first plurality of dense grouping key values and one or more instances of a flag value;
wherein each entry in the first data structure includes either:
one of the first plurality of dense grouping key values at a location within the first data structure, wherein the location corresponds to a particular join key value from a plurality of join key values from a joined-by column of a first table, or
an instance of the flag value at the location within the first data structure, wherein the location corresponds to the particular join key value from plurality of join key values from the joined-by column of the first table;
creating, within the storage of the computing device, a second data structure that comprises a grouping key column and a second dense grouping key column;
wherein the grouping key column includes a plurality of group-by key values from a grouped-by column of the first table;
wherein the second dense grouping key column includes a second plurality of dense grouping key values;
wherein each entry in the second data structure includes one of the plurality of group-by key values, and a corresponding one of the second plurality of dense grouping key values;
creating, within the storage of the computing device, a third data structure that is a hash table that includes a hash bucket for each join key value that corresponds to a respective instance of the flag value;
wherein applying a hash function to a given join key value that corresponds to a given instance of the flag value indicates a location of the hash bucket that corresponds to the given join key value;
within the hash bucket for the given join key value, storing an indication of a given plurality of dense grouping key values with which the given join key value is associated;
determining whether a particular dense grouping key value is stored at the location within the first data structure that corresponds to the particular join key value;
in response to determining that the particular dense grouping key value is stored at the location within the first data structure that corresponds to the particular join key value:

modifying the entry at the location within the first data structure that corresponds to the particular join key value to a particular instance of the flag value;
wherein the method is performed by one or more computing devices.

8. A method comprising:
receiving a query at a database server executing on one or more computing devices;
wherein the query specifies:
   a grouping operation that groups rows from a second table based on values from a grouped-by column of a first table;
   a join operation that joins rows from the second table based on values from a joined-by column of the first table;
creating, within storage of a computing device, a first data structure that comprises a first dense grouping key column;
wherein the first dense grouping key column includes a first plurality of dense grouping key values and one or more instances of a flag value;
wherein each entry in the first data structure includes either:
   one of the first plurality of dense grouping key values at a location within the first data structure, wherein the location corresponds to a particular join key value from a plurality of join key values from the joined-by column of the first table, or
   an instance of the flag value at the location within the first data structure, wherein the location corresponds to the particular join key value from plurality of join key values from the joined-by column of the first table;
creating, within the storage of the computing device, a second data structure that comprises a grouping key column and a second dense grouping key column;
wherein the grouping key column includes a plurality of group-by key values from the grouped-by column of the first table;
wherein the second dense grouping key column includes a second plurality of dense grouping key values;
wherein each entry in the second data structure includes one of the plurality of group-by key values, and a corresponding one of the second plurality of dense grouping key values;
creating, within the storage of the computing device, a third data structure that is a hash table that includes a hash bucket for each join key value that corresponds to a respective instance of the flag value;
wherein applying a hash function to a given join key value that corresponds to a given instance of the flag value indicates a location of the hash bucket that corresponds to the given join key value;
within the hash bucket for the given join key value, storing an indication of a given plurality of dense grouping key values with which the given join key value is associated;
determining whether a particular entry within the first data structure includes a particular dense grouping key value from the first plurality of dense grouping key values or a particular instance of the flag value;
in response to determining that the first data structure includes the particular dense grouping key value from the first plurality of dense grouping key values:
   determining, using the first data structure and the second data structure, a result set for the query;
in response to determining that the first data structure includes the particular instance of the flag value:
   determining, using the third data structure and the second data structure, a result set for the query;
wherein the method is performed by the one or more computing devices.

9. One or more non-transitory storage media storing one or more sequences of instructions which, when executed by one or more computing devices, cause:
receiving a query at a database server executing on a computing device;
wherein the query specifies:
   a grouping operation that groups rows from a second table based on values from a grouped-by column of a first table;
   a join operation that joins rows from the second table based on values from a second column of the first table;
creating, within storage of a computing device, a dense grouping key value-to-join key (DGK-JK) value mapping data structure that comprises a first dense grouping key (DGK) column;
wherein the first DGK column includes a first plurality of dense grouping key (DGK) values and one or more instances of a flag value;
wherein each entry in the DGK-JK value mapping data structure includes either:
   one of the first plurality of DGK values at a location within the DGK-JK value mapping data structure, wherein the location corresponds to a particular join key value from a plurality of join key values from the first column of the first table, or
   an instance of the flag value at the location within the DGK-JK value mapping data structure, wherein the location corresponds to the particular join key value from plurality of join key values from a first column of the first table;
creating, within the storage of the computing device, a dense grouping key value-to-grouping key (DGK-GK) value mapping data structure that comprises a group-by column and a second dense grouping key (DGK) column;
wherein the group-by column includes a plurality of group-by key values from a second column of the first table;
wherein the second DGK column includes a second plurality of DGK values;
wherein each entry in the DGK-GK value mapping data structure includes one of the plurality of group-by key values, and a corresponding one of the second plurality of DGK values;
creating, within the storage of the computing device, a multiple dense grouping key values-to-join key (multi-DGK-JK) value mapping data structure that is a hash table that includes a hash bucket for each join key value that corresponds to an instance of the flag value;
wherein applying a hash function to a join key value that corresponds to an instance of the flag value indicates a location of the hash bucket that corresponds to the join key value;
within the hash bucket for a given join key value, storing an indication of a plurality of DGK values with which the given join key value is associated;
using the multi-DGK-JK mapping structure, in the grouping operation, as a join-key value hash-based index to the plurality of DGK values;

determining a result set for the query by performing the grouping operation and the join operation using the DGK-JK value mapping data structure and the multi-DGK-JK value mapping data structure to match the plurality of join key values from the first column of the first table with the second plurality of DGK values.

10. The non-transitory storage media of claim 9, wherein the storage of the computing device is volatile memory of the computing device.

11. The non-transitory storage media of claim 9, wherein DGK values are a series of contiguous values.

12. The non-transitory storage media of claim 9, wherein the location within the DGK-JK value mapping data structure corresponds to a numerical value of the particular join key value.

13. The non-transitory storage media of claim 9, wherein in the one or more sequences of instructions further comprise instructions for:
   determining, based on a total number of join key values from the plurality of join key values from the joined-by column of the first table satisfy a filtering criteria, size of the DGK-JK value mapping data structure.

14. The non-transitory storage media of claim 9, wherein the plurality of join key values from the joined-by column of the first table are numerical values, further comprising:
   determining, based on the maximum numerical value among the plurality of join key values, size of the DGK-JK value mapping data structure.

15. One or more non-transitory storage media storing one or more sequences of instructions which, when executed by one or more computing devices, cause:
   creating, within storage of a computing device, a first data structure that comprises a first dense grouping key column;
   wherein the first dense grouping key column includes a first plurality of dense grouping key values and one or more instances of a flag value;
   wherein each entry in the first data structure includes either:
      one of the first plurality of dense grouping key values at a location within the first data structure, wherein the location corresponds to a particular join key value from a plurality of join key values from a joined-by column of a first table, or
      an instance of the flag value at the location within the first data structure, wherein the location corresponds to the particular join key value from plurality of join key values from the joined-by column of the first table;
   creating, within the storage of the computing device, a second data structure that comprises a grouping key column and a second dense grouping key column;
   wherein the grouping key column includes a plurality of group-by key values from a grouped-by column of the first table;
   wherein the second dense grouping key column includes a second plurality of dense grouping key values;
   wherein each entry in the second data structure includes one of the plurality of group-by key values, and a corresponding one of the second plurality of dense grouping key values;
   creating, within the storage of the computing device, a third data structure that is a hash table that includes a hash bucket for each join key value that corresponds to a respective instance of the flag value;
   wherein applying a hash function to a given join key value that corresponds to a given instance of the flag value indicates a location of the hash bucket that corresponds to the given join key value;
   within the hash bucket for the given join key value, storing an indication of a given plurality of dense grouping key values with which the given join key value is associated;
   determining whether a particular dense grouping key value is stored at the location within the first data structure that corresponds to the particular join key value;
   in response to determining that the particular dense grouping key value is stored at the location within the first data structure that corresponds to the particular join key value:
      modifying the entry at the location within the first data structure that corresponds to the particular join key value to a particular instance of the flag value.

16. One or more non-transitory storage media storing one or more sequences of instructions which, when executed by one or more computing devices, cause:
   receiving a query at a database server executing on a computing device;
   wherein the query specifies:
      a grouping operation that groups rows from a second table based on values from a grouped-by column of a first table;
      a join operation that joins rows from the second table based on values from a joined-by column of the first table;
   creating, within storage of the computing device, a first data structure that comprises a first dense grouping key column;
   wherein the first dense grouping key column includes a first plurality of dense grouping key values and one or more instances of a flag value;
   wherein each entry in the first data structure includes either:
      one of the first plurality of dense grouping key values at a location within the first data structure, wherein the location corresponds to a particular join key value from a plurality of join key values from the joined-by column of the first table, or
      an instance of the flag value at the location within the first data structure, wherein the location corresponds to the particular join key value from plurality of join key values from the joined-by column of the first table;
   creating, within the storage of the computing device, a second data structure that comprises a grouping key column and a second dense grouping key column;
   wherein the grouping key column includes a plurality of group-by key values from the grouped-by column of the first table;
   wherein the second dense grouping key column includes a second plurality of dense grouping key values;
   wherein each entry in the second data structure includes one of the plurality of group-by key values, and a corresponding one of the second plurality of dense grouping key values;
   creating, within the storage of the computing device, a third data structure that is a hash table that includes a hash bucket for each join key value that corresponds to a respective instance of the flag value;
   wherein applying a hash function to a given join key value that corresponds to a given instance of the flag value indicates a location of the hash bucket that corresponds to the given join key value;

within the hash bucket for the given join key value, storing an indication of a given plurality of dense grouping key values with which the given join key value is associated;

determining whether a particular entry within the first data structure includes a particular dense grouping key value from the first plurality of dense grouping key values or a particular instance of the flag value;

in response to determining that the first data structure includes the particular dense grouping key value from the first plurality of dense grouping key values:
  determining, using the first data structure and the second data structure, a result set for the query;

in response to determining that the first data structure includes the particular instance of the flag value:
  determining, using the third data structure and the second data structure, a result set for the query.

* * * * *

UNITED STATES PATENT AND TRADEMARK OFFICE
CERTIFICATE OF CORRECTION

Page 1 of 2

PATENT NO. : 10,067,954 B2
APPLICATION NO. : 14/806576
DATED : September 4, 2018
INVENTOR(S) : Kociubes et al.

It is certified that error appears in the above-identified patent and that said Letters Patent is hereby corrected as shown below:

On the Title Page

On page 2, Column 2, under Other Publications, Line 34, delete "Tabie" and insert -- Table --, therefor.

On page 2, Column 2, under Other Publications, Line 38, delete "_coprocessm_" and insert -- _coprocessor_ --, therefor.

In the Specification

In Column 5, Line 60, after "FIG. 2" insert -- . --.

In Column 7, Line 59, after "create( )" insert -- , --.

In the Claims

In Column 18, Line 18, in Claim 9, delete "second" and insert -- joined-by --, therefor.

In Column 18, Line 20, in Claim 9, delete "of a" and insert -- of the --, therefor.

In Column 18, Line 33, in Claim 9, delete "first" (first occurrence) and insert -- joined-by --, therefor.

In Column 18, Line 37, in Claim 9, delete "from plurality" and insert -- from the plurality --, therefor.

In Column 18, Line 37, in Claim 9, delete "a first" and insert -- the joined-by --, therefor.

In Column 18, Line 41, in Claim 9, delete "group-by" and insert -- grouping key --, therefor.

In Column 18, Line 44, in Claim 9, delete "group-by" and insert -- grouping key --, therefor.

Signed and Sealed this
Twenty-fourth Day of March, 2020

Andrei Iancu
*Director of the United States Patent and Trademark Office*

CERTIFICATE OF CORRECTION (continued)
U.S. Pat. No. 10,067,954 B2

In Column 18, Line 45, in Claim 9, delete "a second" and insert -- the grouped-by --, therefor.

In Column 18, Line 57, in Claim 9, delete "an" and insert -- a respective --, therefor.

In Column 18, Line 58, in Claim 9, after "to a" insert -- given --.

In Column 18, Line 59, in Claim 9, delete "an" and insert -- a given --, therefor.

In Column 18, Line 60, in Claim 9, after "to the" insert -- given --.

In Column 18, Line 62, in Claim 9, delete "a" and insert -- the --, therefor.

In Column 18, Line 63, in Claim 9, after "of a" insert -- given --.

In Column 18, Line 67, in Claim 9, after "the" insert -- given --.

In Column 19, Line 4, in Claim 9, delete "structure to match" and insert -- structure, the DGK-JK value mapping data structure and the multi-DGK-JK value mapping data structure matching --, therefor.

In Column 19, Line 5, in Claim 9, delete "first" and insert -- joined-by --, therefor.